United States Patent
Bleukx et al.

(10) Patent No.: US 7,768,213 B2
(45) Date of Patent: Aug. 3, 2010

(54) HIGH-EFFICIENCY SINGLE-ENDED FORWARD-FLYBACK ELECTRONIC DRIVER FOR BARRIER DISCHARGE LAMPS

(75) Inventors: Marc Maria Alex Bleukx, Mechelen (BE); Wolfgang Schiene, Aachen (DE); Heinrich Von Busch, Aachen (DE); Stefan Schwan, Herzogenrath (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1059 days.

(21) Appl. No.: 10/585,372

(22) PCT Filed: Dec. 22, 2004

(86) PCT No.: PCT/IB2004/052902

§ 371 (c)(1),
(2), (4) Date: Jul. 5, 2006

(87) PCT Pub. No.: WO2005/076672

PCT Pub. Date: Aug. 18, 2005

(65) Prior Publication Data

US 2009/0174339 A1 Jul. 9, 2009

(30) Foreign Application Priority Data

Jan. 9, 2004 (EP) .................................. 04100051

(51) Int. Cl.
*H05B 41/16* (2006.01)
(52) U.S. Cl. .................................. 315/276; 363/21.12
(58) Field of Classification Search .................. 315/276, 315/274, 209 R, 291, 307, 224; 363/21.12, 363/21.02, 21.04; 323/355

See application file for complete search history.

(56) References Cited

U.S. PATENT DOCUMENTS

2003/0107332 A1* 6/2003 Newman et al. ............. 315/307
2005/0258778 A1* 11/2005 Chen ....................... 315/209 R
2006/0125414 A1* 6/2006 Oda et al. .................... 315/276

FOREIGN PATENT DOCUMENTS

EP 0 927 506 B1 7/1999

* cited by examiner

*Primary Examiner*—Douglas W Owens
*Assistant Examiner*—Ephrem Alemu

(57) ABSTRACT

An electronic circuit topology (1) for driving a predominantly capacitive load (2) with a primary circuit with several components, a secondary circuit with a predominantly capacitive load (2), and a transformer device (4) with a primary side (TX Ia) and a secondary side (TX Ib), connecting the primary circuit with the secondary circuit, the primary circuit components comprise: a source device (3), a drain device (5), and a switching device (6), the transformer device (4) is for transforming an input voltage-current-signal to a suitable output voltage-current signal for supplying the predominantly capacitive load (2), wherein the source device (3) is in serial connection with the transformer device (4), the drain device (5), and the switching device (6), whereby the transformer device (4) comprises means for functioning as a resonant tank circuit, as a transformer device (4) in forward mode, and as a transformer device (4) in flyback mode, so that an single-ended forward-flyback circuit is achieved.

17 Claims, 2 Drawing Sheets

Figure 1:
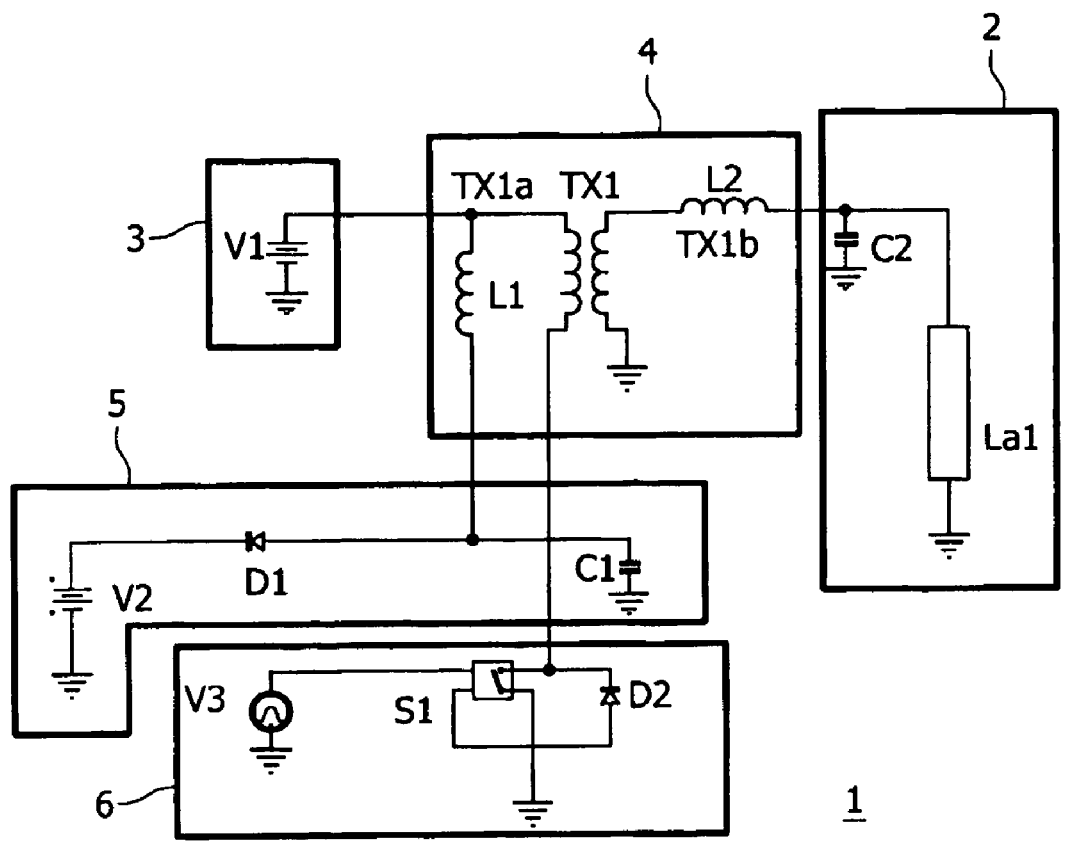

HIGH-EFFICIENCY SINGLE-ENDED FORWARD-FLYBACK ELECTRONIC DRIVER FOR BARRIER DISCHARGE LAMPS

The present invention relates to an electronic circuit topology for driving a predominantly capacitive load, where a pulsed electrical power supply is used. The predominantly capacitive load is preferably a gas discharge based on the principle of the dielectric barrier discharge principle and more preferably is a dielectric barrier discharge in a gaseous medium containing at least one excimer forming component selected from the group comprising noble gas, preferably Xenon. The electronic circuit comprises a primary circuit with several components, a secondary circuit with or connected to a predominantly capacitive load, and a transformer device with a primary side and a secondary side, connecting the primary circuit with the secondary circuit. The primary circuit comprises: a source device supplying power for operating the predominantly capacitive load, a drain device for absorbing at least a part of said power, which is reflected back from the capacitive load during operation, and a switching device for switching a current on the primary side. The transformer device is of a transformer type with a gap, preferably an air gap, for transforming an input voltage-current-signal on the primary side to a suitable output voltage-current-signal for supplying the predominantly capacitive load on the secondary side.

Such well-known electronic circuit topologies containing a driver and a gas discharge lamp are used in a wide area of application, where light waves of a certain wavelength have to be generated for a variety of purposes. Some applications are for example document scanning or copying or generating UV light with wavelength of about 180 nm to 380 nm for industrial purposes such as waste water treatment, disinfection of drinking water, dechlorination or production of ultrapure water. Such topologies with gas discharge lamps as a predominantly capacitive load produce UV light in a highly efficient way on condition that steep high-voltage pulses rather than sinusoidal like excitation waveforms are applied.

In the high power range (>1,000 W) driver topologies are well known for supplying capacitive or predominantly capacitive loads. These drivers are commonly implemented based on a full-bridge circuit driving a high-voltage output transformer.

This well known driver concept has the drawback—if it is used to produce pulse-shaped output signals—that due to the transformer magnetization current a slow gradient of voltage—dV/dt—will be seen by the lamp in-between two pulses, this means the falling edge of the pulse signal is comparatively flat. This normally causes a gas discharge with a low efficiency, because an adequate resting time for deionization cannot be ensured in this way.

In addition to that, the full-bridge needs at least four separate switches of which two are high-side driven. This makes the circuit quite complex. Furthermore, as the current is always running through two switches in series at the primary side, power losses are relatively high and therefore only a moderate driver efficiency can be achieved.

Another known and widely used topology for generating pulse-shaped output signals, especially in the low power range—till about 100 W—is the flyback circuit. The flyback circuit generates clean pulsed waveforms with sufficient resting time in-between two pulses, if it is used in border-discontinuous mode. This means that the switch is kept in the on-state when going from the power reflection phase to the power charging phase, without interruption. A study has been made to expand the output power of such a flyback power supply till 3,000 W. In that case 32 primary MOSFET switches and four high-voltage transformers were necessary, making the circuit very complex. Also the achievable driver efficiency was low (about 73% overall).

EP 0 927 506 B1 describes a lighting system comprising a pulsed-voltage source which is suitable for delivering voltage pulses that are separated from one another in operation by pauses, a dielectric barrier discharge lamp having an at least partially transparent discharge vessel, which is closed and filled with a gas filling or is open and has a gas or a gas mixture flowing through it and is composed of electrically non-conductive material, and electrodes which are connected to the pulsed-voltage source with at least the electrodes of one polarity being isolated from the interior of the discharge vessel by dielectric material. The pulsed-voltage source has an electrical circuit arrangement for producing pulsed-voltage sequences for operation of discharges impeded dielectrically within the discharge vessel of the dielectric barrier discharge lamp, having an oscillator-circuit inductance, a controlled switch which is connected in series with the oscillator circuit inductance, a pulse generator which drives the switch, a current valve which is connected back-to-back in parallel with the switch, the current valve being formed by a discrete element or by the integrated source-drain diode of a MOSFET acting as a switch, an oscillator circuit capacitance which is connected in parallel with the switch, the oscillator circuit capacitance being formed by a discrete element, or in part by a boundary-layer capacitance of a MOSFET acting as a switch and/or by the intrinsic capacitance of the dielectric barrier discharge lamp that is connected, a means for coupling the dielectric barrier discharge lamp, the switch switching on and off alternately in operation by means of the drive signal of the pulse generator. As a result a sequence of voltage pulses, which are separated by pause times, is produced between the electrodes of the dielectric barrier discharge lamp, which is connected to the means.

One drawback of this known topology is that the efficiency is relatively low, because the parasitic components are not used for raising efficiency. Moreover the topology is complex and the number of components is high, the pulsed output waveform is not sufficiently sharp and clean and a useful average output power in excess of about 1,000 W can hardly be achieved.

It is an object of the present invention to provide an electronic circuit topology which is suitable for supplying predominantly capacitive loads with an average output power much higher than 1,000 W, whereby the number of components is reduced, the efficiency is raised to clearly over 80%, and the reliability is high corresponding to industrial environments standards, preferably the voltage peak of the pulse-shaped output signal is constant.

This issue is addressed by an electronic circuit topology for driving a predominantly capacitive load, where a pulsed electrical power supply is used, with a primary circuit with several components, a secondary circuit with or connected to a predominantly capacitive load, and a transformer device with a primary side and a secondary side, connecting the primary circuit with the secondary circuit. The primary circuit components comprise: a source device supplying power for operating the predominantly capacitive load, a drain device for absorbing said power, and a switching device for switching a current on the primary side. The transformer device is of a transformer type with a gap, preferably an air gap, for transforming an input voltage-current-signal on the primary side to a suitable output voltage-current-signal for the predominantly capacitive load on the secondary side, wherein the source device is in serial connection with the transformer device, the drain device, and the switching device, whereby the transformer device being connected to the predominantly capacitive load comprises means for functioning as a resonant tank circuit, as a transformer device in forward mode, and as a transformer device in flyback mode, so that a single-ended forward-flyback circuit for supplying predominantly capacitive loads with pulse-shaped excitation signals is achieved.

Figure 2:
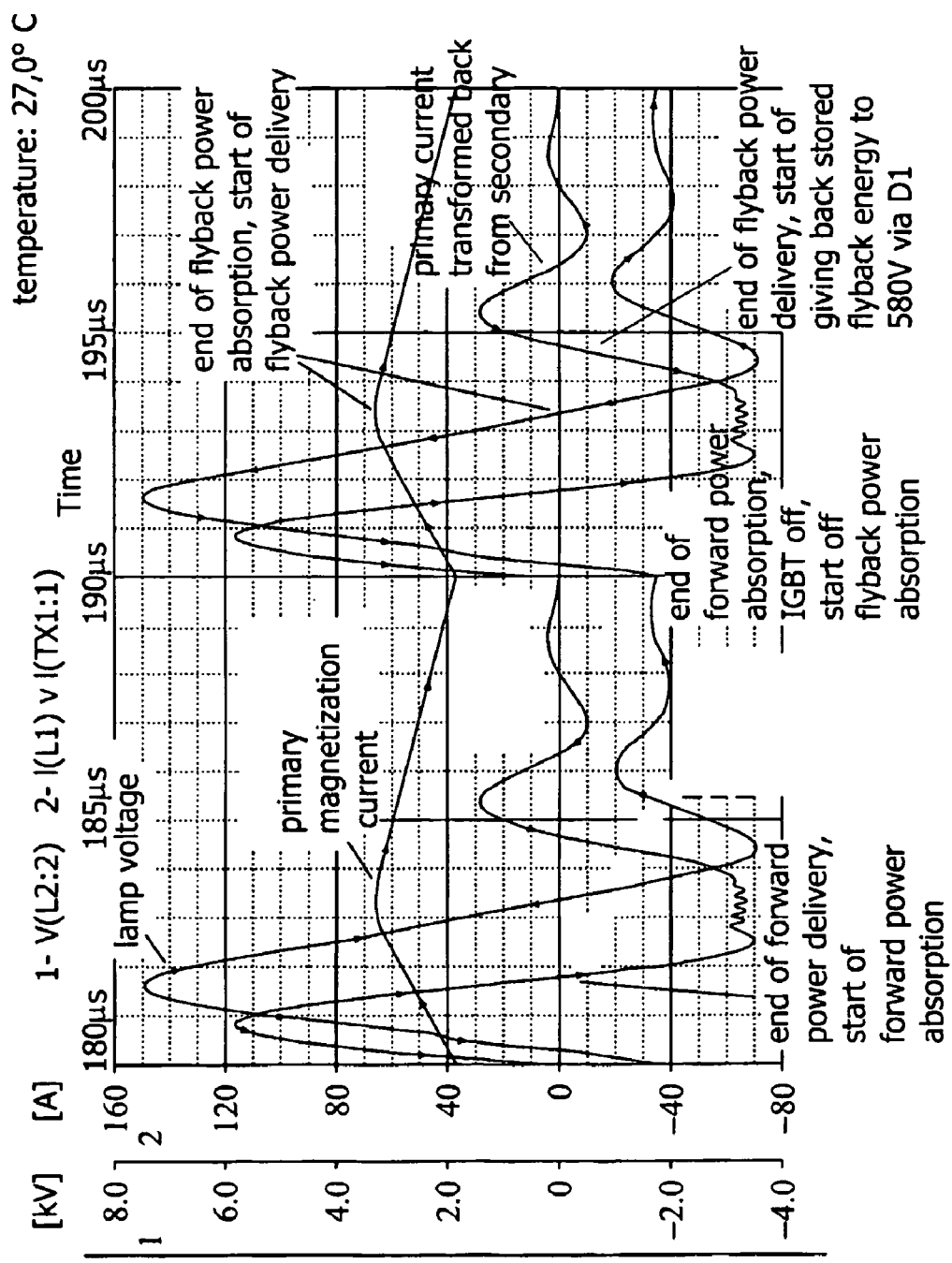

A suitable output voltage-current-signal in the sense of the invention is any voltage suitable for supplying a predominantly capacitive load, connected to the secondary side of the transformer. The voltage depends on the power of said load and can be derived from the power ranges given below in the description. The suitable output-voltage-current-signal preferably has a voltage amplitude in the range from $\geq -20,000$ V to $\leq 20,000$ V, more preferably in the range from $\geq -10,000$ V to $\leq 10,000$ V, and most preferably from $\geq -8,000$ V to $\leq 8,000$ V. The suitable voltage-signal has a peak-like shape with a peak-to-peak value of preferably about $\leq 20,000$ V, more preferably of about $\leq 14,000$ V, and most preferably of about $\leq 10,000$ V. The full width at half maximum (FWHM-) value is preferably about $\leq 5$ µs, more preferably about $\leq 3$ µs, and most preferably about $\leq 2.5$ µs. The corresponding pulse repetition rate is preferably in the range of $\geq 20$ kHz to $\leq 250$ kHz, more preferably in the range of $\leq 30$ kHz to $\leq 200$ kHz and most preferably in the range of $\geq 50$ kHz to $\leq 150$ kHz. In FIG. 2 several graphs are given, from which a suitable output voltage-current-signal can be exemplarily derived.

A predominantly capacitive load in the sense of the present invention is preferably a gas discharge, more preferably a gas discharge of a dielectric barrier discharge type and most preferably a gas discharge lamp based on a dielectric barrier discharge in a pure noble gas or a gas mixture generating UV light. The gas mixture or the gaseous medium contains at least one excimer forming component, preferably selected from the group comprising noble gas, for example Xenon.

The UV light generated by the discharge lamp has a wavelength that is preferably in the range of $\geq 100$ nm to $\leq 380$ nm, more preferably between $\geq 180$ nm and $\leq 320$ nm, and most preferably between $\geq 200$ nm and $\leq 300$ nm. The generated UV light is suitable for use for industrial purposes such as waste water treatment, disinfection of drinking water, dechlorination or production of ultrapure water. The driver comprises an electronic circuit, which generates a suitable power for the predominantly capacitive load from a common source via a transformer device. A suitable power is any power, which is useful for the application. Values for a suitable power are preferably in the range from $\geq 0$ W to $\leq 20,000$ W, more preferably from $\geq 500$ W to $\leq 10,000$ W, and most preferably from $\geq 1,000$ W to $\leq 5,000$ W. The operating frequency the topology is constructed for is preferably in the range from $\geq 10$ kHz to $\leq 500$ kHz, more preferably from $\geq 30$ kHz to $\leq 250$ kHz, and most preferably from $\geq 50$ kHz to $\leq 200$ kHz.

The transformer device splits the total electronic circuit into two parts, on its primary side into a primary circuit and on its secondary side into a secondary circuit. The primary circuit comprises the power supply in form of a common dc voltage source, for example a 400 V dc power supply. The power supply is connected in series with the primary side of the transformer device, a drain device and a switching device. The secondary circuit consists of the secondary side of the transformer device connected in series with a predominantly capacitive load.

A transformer device in the sense of the present invention comprises an ideal transformator, a first inductance on the primary side parallel to the ideal transformer, and a second inductance on the secondary side, being in series with the ideal transformer. The transformer device can be realized as a one-part transformer device in form of a real transformer. The real transformer is constructed such that the function of the first inductance is realized by the air gap in the core of the real transformer and the functioning of the second inductance is realized by leakage induction of the real transformer.

The transformer device comprises a transformer unit, which can be of any type but preferably is of a type with a gap, preferably an air gap. The transformer device has a turns ratio preferably being in the range between $\geq 1:1$ to $\leq 1:20$, more preferably between $\geq 1:4$ to $\leq 1:15$, and most preferably between $\geq 1:8$ to $\leq 1:12$. Additionally the transformer device comprises inductive units being connected to the transformer unit. The transformer device has to be constructed suitably for the predefined application, so that the efficiency of the whole topology is optimized. Preferably the first inductive unit has an inductivity in the range of $\geq 1$ µH to $\leq 200$ µH, more preferably of $\geq 5$ µH to $\leq 100$ µH, and most preferably of $\geq 10$ µH to $\leq 80$ µH. The second inductive unit preferably has an inductivity in the range of $\geq 10$ µH to $\leq 1,000$ µH, more preferably of $\geq 20$ µH to $\leq 600$ µH, and most preferably of $\geq 50$ µH to $\leq 400$ µH. The inductive units can be easily changed, to realize a suitable topology.

The transformer device, being a core part of the electronic circuit topology, unites three functions at the same time: a resonant tank circuit, a transformer in forward mode, and a transformer in flyback mode. By integrating these three functions in one part the present invention saves several components while generating efficiently a high output power.

The power, which is reflected back from the capacitive load during operation, is efficiently absorbed by the drain device formed as an absorption line, comprising a power drain, a diode, and a capacitor. The power absorption line is suitable for preferably a voltage being in the range from $\geq 50$ V to $\leq 1,000$ V, more preferably from $\geq 200$ V to $\leq 750$ V, and most preferably from $\geq 400$ V to $\leq 580$ V. The capacitor being a parasitic component of the circuit topology therefore has a capacitance of preferably $\geq 100$ pF to $\leq 1,000$ pF, more preferably $\geq 250$ pF to $\leq 750$ pF, and most preferably $\geq 430$ pF to $\leq 500$ pF.

The switching device preferably comprises only one switching unit. In fact the switching unit can comprise several real switching units for example several IGBT's and/or MOSFET's, whereby the real switching units can be arranged parallel or in series to each other. In comparison to commonly used full-bridge circuits with four switching units, each consisting of at least one real switching unit, this concept saves several switching components.

The present invention produces furthermore a much cleaner pulse-shaped voltage signal than known from common full-bridge converters.

Preferably the means for functioning as a resonant tank circuit, as a transformer device in forward mode, and as a transformer device in flyback mode comprises at least one transformer unit selected from the group of real transformers and at least one inductive unit on the secondary side, whereby for this inductive unit it is suitable to use the leakage induction of the transformer device so that a resonant tank circuit is achieved. The transformer unit can be realized as an aforementioned real transformer. As described before, the transformer device has to be exactly matched to the predominantly capacitive load. Therefore both the capacity of the cabling, all other parasitic capacities and the capacity of the load have to be taken into account. To achieve a suitable transformer device the values of the two inductive units—the first inductance and the second inductance—must be adapted. By this adaptable inductive unit, more precisely by this second inductance the transformer device can be exactly designed for a defined application or load. This enables the electronic circuit topology to form a transformer device that makes a series resonant tank circuit together with the transformer leakage induction, the load capacity, the cabling capacity and the transformer's capacity. By using the leakage induction of the transformer unit, the useful output voltage peak is significantly higher compared to common solutions where the leakage induction of the transformer is not tuned to the lamp. Preferably the ratio between the output voltage peak of a common transformer device to the output voltage peak of the transformer device of the present invention is $\leq 50\%$, more preferably $\leq 40\%$, and most preferably $\leq 20\%$. For example, if the output voltage peak of a common transformer device is about 2 kV, than the output voltage peak of the transformer device according to the present invention is preferably $\geq 4$ kV (ratio=50%), more preferably $\geq 5$ kV (ratio=40%), and most preferably $\geq 10$ kV (ratio=20%).

Therefore it is an advantage of the invention that the second inductive unit on the secondary side of the transformer device is connected in series with the predominantly capacitive load, so that the second inductive unit, which can also be realized by the leakage induction of the real transformer, builds a series resonant tank circuit with the capacitance of the predominantly capacitive load and the capacity of cabling.

As a result of this setup of the transformer device, the useful output voltage peak of the secondary side is not transferred to the primary side. Therefore low voltage switches can be used on the primary side, which are less complex. By this arrangement the parasitic components like transformer leakage induction and/or cabling capacitance together with the load capacitance are used efficiently for generating high voltage peaks, instead of being the cause for extra losses.

To achieve a suitable transformer device, the first inductive unit on the primary side, which can also be realized by the air gap of the real transformer, is parallel to the transformer unit.

A further advantage of the present invention is that the primary side of the transformer device is connected in series with the source device, the drain device and/or the switching device. This easy to achieve arrangement enables a three-mode functioning of the transformer as described before, whereby the secondary side peak voltage is not transferred to the primary side. This so called resonance peak comprises a power delivery part and a power absorption part. During the resonance peak the transformer is used in forward mode. At the same time magnetization energy is stored into the transformer core, which comprises for this purpose—as described before—, a gap and more preferably an air gap.

Another advantage of the present invention is that the drain device comprises a power absorber unit, a capacitance unit, and a diode for returning power to the DC supply or the DC supply device. By this arrangement the power flowing to the drain device can easily be returned to the DC source device, preferably via an external down-converter. Preferably the power absorber is of a dc-type with a voltage being in the range from $\geq 50$ V to $\leq 1,000$ V, more preferably from $\geq 200$ V to $\leq 750$ V, and most preferably from $\geq 400$ V to $\leq 580$ V. The diode is of a standard type diode. The capacitance of the capacitor is preferably in the range from $\geq 100$ pF to $\leq 1,000$ pF, more preferably from $\geq 250$ pF to $\leq 750$ pF, and most preferably from $\geq 430$ pF to $\leq 500$ pF.

Preferably the electronic circuit topology's switching device comprises a control unit, preferably in form of a pulse- or function generator, for controlling the following switching unit, a switching unit for switching on/off the current on the primary side of the transformer device and a diode unit. The control unit preferably has a first voltage of about 0 V and a second voltage of about 15 V. Preferably the rise-time is about 10 ns and preferably the fall time is about the same as the rise-time. The pulse width (PW) is preferably in the range between $\geq 1$ µs to $\leq 6$ µs, more preferably between $\geq 2$ µs to $\leq 5$ µs, and most preferably between $\geq 2.1µ$ to $\leq 3$ µs, whereby the PW is preferably at about 2.36 µs and preferably the period of one switching cycle is 10 µs.

The diode is mounted in parallel to the switching unit for achieving a zero-voltage switching circuit. The diode conducts the reverse current and thus—although being not the cause for the zero-volt switching—the diode is a necessary component for achieving the zero-voltage switching effect.

The predominantly capacitive load preferably comprises at least one gas discharge lamp based on a dielectric barrier discharge filled with at least one excimer forming gas, preferably a noble gas like xenon, or a mixture of excimer forming gases for generating light waves, preferably UV-light waves. A gas discharge lamp based on a dielectric barrier discharge can easily be designed for generating light waves in a given power range. The given power range for the barrier discharge lamp or any other capacitive or predominantly capacitive loads according to the present invention is preferably between $\geq 0$ W and $\leq 20,000$ W, more preferably between $\geq 500$ W and $\leq 10,000$ W, and most preferably between $\geq 1,000$ W and $\leq 5,000$ W. The electronic circuit topology is not only suitable for supplying dielectric barrier discharge lamps but also for supplying any predominantly capacitive load, where the use of pulse-shaped waveforms is favorably If a dielectric discharge lamp is used, the dielectric discharge lamp has an useful average power being preferably in the range from $\geq 0$ W to $\leq 20,000$ W, more preferably from $\geq 500$ W to $\leq 10,000$ W, and most preferably from $\geq 1,000$ W to $\leq 5,000$ W, most preferably the power is about 3,000 W and the discharge lamp produces light waves having a wave length preferably being in the range from $\geq 100$ nm to $\leq 380$ nm, more preferably from $\geq 180$ nm to $\leq 320$ nm, and most preferably from $\geq 200$ nm to $\leq 300$ nm. To generate light waves with a prescribed wavelength an additional phosphor coating of the lamp bulb—inside the lamp bulb as well as outside the lamp bulb—can be used. Of course these values mentioned here are also valid for other predominantly capacitive loads according to the present invention.

The circuit can be used for dimming purposes also. This is achieved by using a higher source voltage at equal absorption line voltage at a lower repetition frequency. This is done to keep the mag-demag-ratio products on an equal level. The values of the single electronic parts remain the same until a dimming level of 50% of the maximum lamp power is reached.

These and other aspects of the invention will be apparent from and elucidated with reference to the embodiments described hereinafter.

FIG. 1 shows a schematic diagram of an electronic circuit topology according to the present invention operating according to the single-ended forward-flyback (SEFF) principle, and FIG. 2 shows a graph giving the output voltage of transformer unit applied to the capacitive load in combination with the transformer's primary magnetization current and the primary current transformed back from the secondary side over a time period of 2×10 µs.

FIG. 1 shows the schematic diagram of an electronic circuit topology 1 for driving a predominantly capacitive load 2 according to the present invention. The electronic circuit topology 1 according to FIG. 1 comprises or is connected to or coupled with a predominantly capacitive load 2. In this special case the predominantly capacitive load 2 is represented by a gas discharge lamp La1 based on a dielectric barrier discharge (DBD) containing two electrodes. One of these electrodes is connected to ground. The other electrode of the dielectric barrier discharge lamp La1 is connected with the secondary (high voltage) side of the transformer unit. The capacity of the cabling between the transformer unit and the DBD-lamp is represented by a discrete capacitance unit C2 with a capacitance of about 250 pF. The DBD lamp La1 and the capacitance of the cabling, represented by the discrete capacitance unit C2, form an impedance representing the predominantly capacitive load 2.

The predominantly capacitive load 2 is supplied by a source device 3 via a transformer device 4. The transformer device 4 is connected to ground via a series connection of a drain device 5 and a switching device 6.

The source device 3 generates a constant output voltage of about 400 V, applied to the primary side of the transformer device 4.

The transformer device 4 comprises an ideal transformer unit TX1 with a primary side TX1a and a secondary side TX1b, and—in this special case—with a turns ration of about 1:9.7. Furthermore the transformer device 4 comprises on each side of the transformer unit TX1a, TX1b a single inductive unit L1, L2. The first inductive unit L1 on the primary side TX1a of the ideal transformer TX1, which represents the air gap of a real transformer, is in parallel connection to the ideal transformer TX1 and has an induction of about 40.5 µH. On its secondary side TX1b the transformer device TX1 comprises a second inductive unit L2, which represents the leakage inductance of a real transformer, with an inductance of about 200 µH. The other side of the second inductive unit L2 is connected to the high voltage side of the predominantly capacitive load 2, thus the second inductive unit L2 is in series connection to the ideal transformer TX1 and the predominantly capacitive load 2.

The drain device 5 forms an absorption line comprising a drain unit in form of a power absorber unit V2, a diode D1 and a capacitor C1, whereby the capacitor C1 is parallel to the diode D1 and the absorber unit V2 being in series with each other. The power absorber unit V2 is formed by a dc-source with a constant voltage of 580 V. The capacitor C1 has a capacitance of about 430 pF.

The switching device 6 comprises a control unit in form of a pulse-generator V3 for controlling the switching unit S1. The values of the pulse generator V3 are: first voltage V1=0 V, second voltage V2=15 V, rise time TR=10 ns, fall-time TF=10 ns, pulse width PW=2.36 µs, and period time PER=10 µs. The generated pulse is transmitted to the control input pole of the switching unit S1. The switching characteristic of the switching unit S1 is VOFF=5 V, and VON=7V. In parallel to the switching unit S1 a diode D2 is connected, which by-passes the switch in case the voltage drop over the switching unit S1 is negative.

FIG. 2 shows a graph giving the output voltage of the transformer device 4 applied to the predominantly capacitive load 2 in combination with the transformer's primary magnetization current and the primary current transformed back from the secondary side over a time period of 2×10 µs with values measured at a temperature of about 27.0° C. Although not shown in the graph, the primary current is exactly the sum of the two split primary currents.

The output voltage applied to the lamp starts at about −2.0 kV and increases within about 1.8 µs to a maximum value of about 7.5 kV, then continuously decreases to a minimum value of about −3.5 kV within 2.7 µs after reaching the peak amplitude. After this the lamp voltage returns within 5.5 µs in a damped oscillation to the starting voltage level at about −2.0 kV. The period of one pulse is about 10 µs, thus the pulse repetition rate is 100 kHz.

In the graph the primary current transformed back from the secondary side is shown. At the starting point the primary current transformed back from the secondary side is about 0 A. After about 0.8 µs a maximum of about 115 A is reached, from which the current decreases to a minimum peak at about −70 A after 1.8 µs. When this point is reached, the forward power absorption ends and the flyback power absorption starts. In a damped oscillation the current swings about 1.5 µs 5 times around a value of about −65 A, than raises to a local maximum at about 28 A after about 5.5 µs calculated from the start. After reaching this local maximum the current decreases to −10 A after about 7 µs from the start and oscillates with damping around a value of 0 A, reaching 0 A after 10 µs, which ends the period.

Furthermore the primary magnetization current is shown in the graph. The primary magnetization current starts at about 38 A and increases in a linear way to a maximum peak of about 66 A after about 3.5 µs. Then the magnetization current decreases in a linear way to the initial value of about 38 A within 6.5 µs, so that the period ends and a quasi-triangular graph results.

The SEFF-circuit starts in forward power delivery mode. At the same time magnetization energy is stored into the transformer core. The lamp's voltage graph is similar to the primary current graph, but is phase-delayed and amplified. The resonance peak consists of two parts, a power delivery part till the peak of the lamps voltage in the graph and a power absorption part until the minimum peak of the primary transformed current. During the rise of the resonance peak the transformer device is used in forward mode. The switching device switches off exactly at the moment of reverse current, that is when the current runs through diode D2. In this way a zero-voltage switching is obtained, so that only low switch-off losses occur. From that moment on, the transformer device is used in flyback mode. In this mode the transformer device makes use of the magnetization current stored during the operation in forward mode. This magnetization is used for a fast continuation of the lamp voltage swing, until the diode in the absorption line becomes conductive and the remaining stored flyback energy is rendered to the 580 V line. In the present situation the lamp voltage pulse is very steep, leading to an efficient gas discharge.

LIST OF REFERENCE NUMBERS 1 electronic circuit topology
2 capacitive or predominantly capacitive load
3 source device
4 transformer device
5 drain device
6 switching device
DBD dielectric barrier discharge
TX1 ideal transformer unit
TX1a primary side (of the ideal transformer unit)
TX1b secondary side (of the ideal transformer unit)
L1 first inductive unit (air gap of real transformer)
L2 second inductive unit (leakage inductance of real transformer)
C1 first capacitance unit
C2 second capacitance unit
D1 first diode
D2 second diode
S1 switching unit
V1 first power supply unit V2 power absorber unit
V3 pulse voltage generator
La1 dielectric barrier discharge lamp

The invention claimed is:

1. A circuit for driving a predominantly capacitive load, the circuit comprising:
   a primary circuit;
   a secondary circuit connected to the predominantly capacitive load; and
   a transformer device with a primary side and a secondary side connecting the primary circuit with the secondary circuit,
   wherein the primary circuit comprises:
      a source device supplying power via the transformer device for operating the predominantly capacitive load,
      a drain device or absorbing at least a part of said power, which is reflected back from the predominantly capacitive load during operation,
      a switch for switching a current on the primary side of the transformer device, and
      a diode reverse connected across the switch so as to conduct a reverse current through the primary side of the transformer when the switch is turned off,
   wherein the transformer device is of a transformer type with a gap for transforming an input voltage-current-signal on the primary side to an output voltage-current-signal for supplying the predominantly capacitive load on the secondary side,
   wherein the source device is in serial connection with the transformer device, the drain device, and the switching device, and
   wherein the transformer device comprises means for forming a resonant tank circuit with the predominantly capacitive load.

2. A circuit for driving a predominantly capacitive load, where a pulsed electrical power supply is used, with:
   a primary circuit with several components,
   a secondary circuit with or connected to a predominantly capacitive load, and
   a transformer device with a primary side and a secondary side, connecting the primary circuit with the secondary circuit, the primary circuit components comprise:
      a source device supplying power via the transformer device for operating the predominantly capacitive load
      a drain device for absorbing at least a part of said power, which is reflected back from the predominantly capacitive load during operation, and
      a switching device for switching a current on the primary side,
   wherein the transformer device is of a transformer type with a gap for transforming an input voltage-current-signal on the primary side to a suitable output voltage-current-signal for supplying the predominantly capacitive load on the secondary side,
   wherein the source device is in serial connection with the transformer device, the drain device, and the switching device,
   whereby the transformer device being connected to the predominantly capacitive load comprises the predominantly capacitive load comprises means for functioning as a resonant tank circuit, as a transformer device in forward mode, and as a transformer device in flyback mode, so that a single-ended forward-flyback circuit for driving predominantly capacitive loads with pulse-shaped wave forms is achieved, and
   wherein the drain device comprises a power absorber unit, a capacitance unit, and a diode for returning power to the supply device via an external down-converter.

3. The circuit of claim 2, wherein the switching device includes a switch, and a diode reverse connected across the switch so as to conduct a reverse current through the primary side of the transformer when the switch is turned off.

4. The circuit of claim 2, wherein the switching device includes:
   a switch; and
   a periodic pulse generator connected to the switch and configured to apply a series of periodic pulses to the switch for periodically turning on the switch.

5. The circuit of claim 2, wherein the predominantly capacitive load comprises at least one discharge lamp.

6. The circuit of claim 2, wherein the predominantly capacitive load comprises at least one dielectric barrier discharge lamp.

7. A circuit for driving a predominantly capacitive load, the circuit comprising:
   a primary circuit;
   a secondary circuit connected to the predominantly capacitive load; and
   a transformer device with a primary side and a secondary side connecting the primary circuit with the secondary circuit,
   wherein the primary circuit comprises:
      a source device supplying power via the transformer device for operating the predominantly capacitive load,
      a drain device for absorbing at least a part of said power, which is reflected back from the predominantly capacitive load during operation,
      a switch for switching a current on the primary side of the transformer device, and
      a periodic pulse generator connected to the switch and configured to apply a series of periodic pulses to the switch for periodically turning on the switch,
   wherein the transformer device is of a transformer type with a gap for transforming an input voltage-current-signal on the primary side to an output voltage-current-signal for supplying the predominantly capacitive load the secondary side,
   wherein the source device is in serial connection with the transformer device, the drain device, and the switching device, and
   wherein the transformer device comprises means for forming a resonant tank circuit with the predominantly capacitive load.

8. The circuit of claim 7, wherein the means for forming the resonant tank circuit comprises a leakage induction of the transformer.

9. The circuit of claim 7, wherein the drain device comprises a power absorber unit, a capacitance unit, and a diode for returning power to the supply device via an external down-converter.

10. The circuit of claim 7, wherein the primary circuit further includes a diode reverse connected across the switch so as to conduct a reverse current through the primary side of the transformer.

11. The circuit of claim 7, wherein the predominantly capacitive load comprises at least one dielectric barrier discharge lamp.

12. The circuit of claim 7, wherein the predominantly capacitive load comprises at least one gas discharge lamp.

13. The circuit of claim 12, wherein the gas discharge lamp has an operating power from >0 W to ≦20,000 W, and the discharge lamp produces light having a wave length from ≧100 nm to ≦380 nm.

14. The circuit of claim 13, wherein the operating power is ≧500 W and ≦20,000 W.

15. The circuit of claim 13, wherein the operating power is ≧1000 W and ≦5,000 W.

16. The circuit of claim 13, wherein the wavelength is ≧180 nm to ≦320 nm.

17. The circuit of claim 13, wherein the wavelength is ≧200 nm to ≦300 nm.

* * * * *